United States Patent [19]
Tseng

[11] Patent Number: 4,630,254
[45] Date of Patent: Dec. 16, 1986

[54] CONTROLLED STAR NETWORK

[75] Inventor: Chong-Wei Tseng, Santa Monica, Calif.

[73] Assignee: TRW Inc., Redondo Beach, Calif.

[21] Appl. No.: 665,324

[22] Filed: Oct. 26, 1984

[51] Int. Cl.⁴ .......................... H04J 15/00; H04B 9/00
[52] U.S. Cl. .......................................... 370/1; 370/60; 455/607
[58] Field of Search ........................ 370/85, 94, 60, 1; 455/606, 607, 612

[56] References Cited

U.S. PATENT DOCUMENTS

| | | | |
|---|---|---|---|
| 4,227,260 | 10/1980 | Vosvodich et al. | 455/607 |
| 4,347,498 | 8/1982 | Lee et al. | 370/60 |
| 4,417,334 | 11/1983 | Gunderson et al. | 370/1 |

FOREIGN PATENT DOCUMENTS

0187037 11/1983 Japan .

Primary Examiner—Douglas W. Olms
Assistant Examiner—Frank M. Scutch, III
Attorney, Agent, or Firm—Noel F. Heal

[57] ABSTRACT

An optical fiber communications network using a star coupler to broadcast a selected transmission received on incoming channels from one of a number of stations, over an equal number of outgoing channels to all of the stations. Each station with a message packet to send begins transmitting and continues to transmit the packet repetitively until sensing the same packet being broadcast on the outgoing channels from the star coupler. A selection device monitors all of the incoming channels, registers and queues all new transmissions on the channels, and, when the star coupler is free, selects one incoming channel for broadcast of its message through the star coupler. All messages are in this manner effectively queued, and the maximum network transmission delay is a relatively low and bounded quantity. A highly efficient time-slotted version is disclosed, in which transmission must begin at the start of designated time slots, as well as an unslotted version. A hierarchical version including multiple star couplers and selection devices is also disclosed, to handle a relatively large number of stations. The network can also be adapted to handle continuous-traffic stations.

15 Claims, 9 Drawing Figures

CONTROLLED STAR NETWORK

BACKGROUND OF THE INVENTION

This invention relates generally to communication networks, and more particularly, to local-area networks having multiple nodes or stations that may transmit data to each other over the network. A number of schemes have been proposed for connecting the multiple stations together for this purpose. There are three basic configuration types that are commonly used. One type includes one or more common communication links, or buses to which each of the stations is connected. A message from a station is broadcast to all other stations, but only the intended destination station will pick up the message. Another type is a star or hub network in which each station can transmit its message to a central control unit, which then relays the message to the stations over the corresponding communication channels. The third type is a ring network, in which a message is relayed by each station to the next one in the ring, and the destination of the source station takes the message out of the ring.

Use of any such network has to be governed by a set of protocols or rules. The network protocols fall generally into two categories: contention schemes and non-contention schemes. In a contention scheme, stations may begin transmitting whenever they have a message to send, but may continue transmitting only if the network is not already in use. If such a "collision" is detected, all the stations involved in the collision stop transmission and later attempts must be made for access to the network. In a non-contention scheme, some form of time-division multiplexing is usually involved. For example, each station can be allocated its own time slot on a cyclic basis. Alternatively, a token is passed around to coordinate the message transmissions. In more complex non-contention schemes, a central controller may handle requests for network access by the respective stations, and access may be granted on some type of priority basis.

One problem with contention schemes in general is that there is the possibility of an unbounded transmission delay. If a station attempts to transmit but has to abort the transmission because other stations are also transmitting, there is always the possibility that the same thing will happen on the next attempt. In heavy traffic conditions, the transmission delay is completely without limit, and this is an unacceptable condition for most practical communications systems. In general, an ideal local area network should render high performance over a wide range of transmission data rates and traffic conditions.

Since many communications systems are now being planned or implemented in optical fiber form, another important requirement of an ideal local area network is that it be compatible with optical fiber technology. The ideal network should also be capable of handling continuous traffic from a station when required. In some applications, a station may have to transmit a continous sequence of data packets for some periods of time, to provide real-time control information, for example. An ideal network should be capable of handling this type of traffic, as well as ordinary traffic that is transmitted in accordance with some predefined set of priorities.

The ideal network should be designed in accordance with what is known as the over-commitment principle, that is, it should have a capacity only slightly greater than the average traffic load expected from all stations, and should provide some technique for smoothing out the occasional peaks or above-average traffic conditions.

Prior to this invention, no optical fiber local area network has provided all of these ideal features. A significant development in the field of communication networks was a system known as Ethernet, first described by R. M. Metcalfe et al. in a paper entitled "Ethernet: Distributed Packet Switching for Local Switching Networks," Comm. of the ACM, July 1976, pp. 395–404. Its fiber optics variation, Fibernet, is described by E. G. Rawson and R. M. Metcalfe in "Fibernet: Multimode Optical Fibers for Local Computer Networks," IEEE Trans. on Communications, July 1978, pp 983–90. Both Ethernet and Fibernet have the disadvantage that a station may have to wait for an indefinite time to transmit a packet of data, because of possible repeated collisions with other packets accessing the network simultaneously. This possibility of an unbounded transmission delay renders both Ethernet and Fibernet unsuitable for the transmission of real-time or continuous traffic. Moreover, as the data rate of the transmission medium increases, the efficiency for maximum throughput of these systems decreases.

Further developments, using a unidirectional bus, are known as Express-net and C-net. Express-net is described in a paper presented by L. Fratta et al., entitled "The Express-Net: A Local Area Communications Network Integrating Voice and Data," at the International Conference on Data Communication Systems: Performance and Applications, Paris, September, 1981. Express-net has a relatively high efficiency and a relatively low bounded network delay, making it suitable for continuous or real-time traffic. C-net is another network with a unidirectional data bus. It avoids some of the difficulties of Express-net, but has a maximum network delay almost double that of Express-net.

Fasnet is yet another network configuration, described in a paper by J. O. Limb et al. entitled "Description of Fasnet—A Unidirectional Local-Area network," The Bell System Technical Journal, Vol. 61, No. 7, September, 1982. All of these systems, including Express-net, C-net, and Fasnet, have a network delay in the order of $NT_p$, where N is the number of stations and $T_p$ is the packet transmission time, i.e., for the one message packet to pass a fixed point in the network. This is also true of a system referred to by the name D-net, described in a co-pending patent application by the present inventor, Ser. No. 449,083, filed on Dec. 13, 1982, and entitled "Communication Network and Method For It's Use". If a continuous-traffic station has a need to transmit a packet of data every $t_g$ seconds, then the number of stations that any of these networks can serve is limited to:

$$N^* = t_g/T_p.$$

Otherwise, the quality of service to the continuous-traffic station cannot be guaranteed. To assure service to the continuous-traffic station, the channel capacity of the network has to be larger than the possible maximum or peak load of the network, and this is clearly wasteful since the average traffic load from all stations can be relatively low.

In addition, the architectures of the systems mentioned above are not ideally compatible with optical fiber technology. The systems each require several optical taps and couplings to be made for each station. This severely limits the number of stations that can be attached to the network, and adds difficulty to the design of receivers at the stations, since the receivers have to have a large dynamic range. Another disadvantage is that a single malfunctioning station can, by continued transmission, prevent or degrade the performance of the network.

Some of the disadvantages described are avoided by a network that employs star couplers instead of input and output buses as the basic configuration. The general principle of this type of system is that each of the stations is connected to the coupler by its own two transmission lines, one for sending and the other for receiving. A message from a particular station is broadcast to all stations by the coupler, but as in any network, there must be an effective technique to resolve conflicts between simultaneous requests for transmission.

One network of this type is disclosed in U.S. Pat. No. 4,428,046, issued in the names of Chari et al. In the Chari et al. network, a number of stations, referred to as "subsystems," are connected to a star coupler by sending and receiving transmission lines, and the star coupler includes contention circuitry for ensuring that no more than one selected subsystem can pass a message through the star coupler at any particular time. The contention circuitry operates in accordance with a set of predefined and fixed station priorities. If two or more messages from different subsystems are received simultaneously, the one from the subsystem with the highest priority is the one that is processed first. As in some of the other network configurations discussed, the subsystems or stations whose messages were not accepted for transmission must retransmit at some later time. The possible network delay is, therefore, unbounded.

Another drawback to the approach of the Chari et al. network is that, although one station may monopolize the network and exclude other stations, it is not possible to provide a predetermined continuous transmission capability, for stations that have a need to transmit real-time data in a continuous fashion. Yet another drawback is that the efficiency of the network decreases as the round-trip transmission time increases. Finally, as the number of stations is increased, the star coupler circuitry becomes increasingly complex, and less suitable for mass production.

It will be appreciated from the foregoing that there is still a need for improvement in the field of local area network systems, particularly of the type suited to optical fiber technology. In particular, what is needed is a fiber-optic communications network that has high performance characteristics, specifically a low bounded delay and a high efficiency, over a wide range of data transmission rates. Also, the system should be able to accommodate continuous-traffic stations as well as stations having normal sporadic traffic demands, and should have a capacity of only slightly greater than is necessary to accommodate average traffic load conditions. Ideally, the system should also be unaffected by the malfunction of any particular station. The present invention provides a novel solution to these requirements.

SUMMARY OF THE INVENTION

The present invention resides in a controlled star coupler communications network in which, if the star coupler is busy broadcasting a message, any other station which also transmits a message is queued for subsequent broadcast through the coupler. This guarantees that the network delay will be bounded or finite.

Briefly, and in general terms, the controlled star system of the invention comprises a plurality of transmitting and receiving stations, an equal plurality of incoming transmission channels from the stations, selection means for choosing one of the incoming channels for broadcast, an equal plurality of outgoing transmission channels for transmission of messages to the respective stations, and a star coupler for distributing the message received on the selected incoming channel to all of the outgoing channels. An important additional feature of the system is that the selection means includes queuing means, for queuing any incoming channel for later selection when the star coupler is already busy broadcasting a prior message. The queuing means can employ any desired priority discipline, but in one of the illustrative embodiments of the invention each message has an encoded priority, and messages are queued in accordance with the message priority. If the messages have equal priorities, they are queued for transmission in the same sequence in which they were originated.

Each station has a relatively simple mode of operation, whereby it begins transmission whenever a message is ready to send, and continues transmitting repetitively until it senses its own message being broadcast by the star coupler. If two stations are transmitting simultaneously, the conflicts for use of the outgoing channels are resolved in the selection means at the coupler. Only one incoming channel is selected for current connection to the outgoing channels.

In one form of the invention, for use with single-mode optical fibers, the selection means includes a plurality of optical switches in the incoming channels, and switch selection means having sensing lines connected to the incoming channels and control lines connected to the switches. The switch selection means selects and closes only one of the optical switches, based on information received over the sensing lines from the incoming channels, to connect the light signal on the selected incoming channel to the star coupler.

For use in multimode optical fiber systems, the selection means may include a plurality of light detectors to which the incoming channels are connected, control logic for processing the outputs from the detectors, and a light emitter for generating light signals corresponding to message signal from the selected incoming channel.

The selection means of the invention operates in accordance with a particular set of access protocols and selection rules. There are several illustrative embodiments of the invention, having differing access protocols and selection rules. First there is an "unslotted" version of the invention, in which messages are not transmitted in any particular time slots, and a "slotted" version in which available time is divided into equal time slots and a transmission can begin only at the beginning of a time slot. Another important selection rule involves the distinction between a non-preference version, in which all stations and messages are accorded equal priority, and a priority-access version in which message packets have assigned priorities. Further, there is a hierarchical version of the system of the invention, in which the number of stations is too large to be conveniently handled by a single star coupler, and a hierarchy of star couplers is established.

First, the non-preference, non-hierarchical, unslotted version of the invention will be discussed as the most basic version, since it has features in common with the other versions. In this basis version, a station with a message packet to transmit merely begins transmitting when ready, and continues transmitting the message packet repetitively until it senses the same message packet being broadcast back along the outgoing channel connected to the station. At the star coupler, the selection means maintains an active queue of stations with messages to transmit, and after completing one transmission, always selects the next station from the heat of the active queue. An important feature of the invention is that, after completing a transmission, the selection means imposes a transmission block on the station whose message was just transmitted, for a preselected time interval. Upon detection of a new message from one of the stations, the selection means places the transmitting station in the active queue, provided the station is not still in a blocked condition.

In the prioritized version of the system, the selection means also includes priority sensing means, to sense the priority of each incoming message packet. The priority can be encoded into the message or be inherent in the station number, as desired. If, for example, there are two priorities, the queuing means includes a high-priority queue and a low-priority queue. The selection means selects from the head of the high-priority queue before selecting from the low-priority queue. Although this concept is illustrated in terms of separate queues for the separate priorities, it will be understood that the same principle could be implemented by means of a single queue and means for inserting items at selected positions within the queue.

In the hierarchical version of the invention, there are too many stations to be connected to a single star coupler. Instead the stations are connected in groups to multiple star couplers and selection means. However, each selection means is not connected to the corresponding star coupler, but instead provides input to an incoming channel for a higher-order selection means. Similarly, each star coupler receives its signal input not from the corresponding selection means, but from a higher-order star coupler. The transmission path from a station passes along an incoming channel to a selection means, then over a channel to a higher-order selection means. The higher-order selection means passes the message to the higher-order star coupler, which broadcasts to the lower-order star couplers, and through them to the outgoing channels and the individual stations.

Without using a hierarchical structure, an alternative is to employ a number of light emitters, each of which broadcasts message signals through an associated star coupler connected to the corresponding group of stations. The selecting means selects one of the active transmitting stations to drive the multiple light emitter at the same time.

The slotted version of the invention provides for improved efficiency by requiring that stations begin transmission only at the beginnings of fixed message intervals or slots. The selection means checks to determine which are the newly transmitting stations at the beginning of each time slot. Newly transmitting stations that are not in a blocked condition are placed into a queue, or one of several queues, as in the unslotted version. After a station is selected for transmission, it is blocked for a preselected number of time slots. A continuous-traffic station can be accorded high priority for slot access, such that access is assured every $t_g$ seconds, where $t_g$ is the required packet spacing for the continuous-traffic station.

It will be appreciated from the foregoing that the present invention represents a significant advance in the field of local area networks employing optical fibers for communication. In particular, the invention provides a highly efficient communication network with a bounded or finite network delay, resulting from a queuing arrangement that avoids retransmission by stations encountering busy network conditions. The network of the invention also has the capability to handle continuous-traffic stations, and the capability to be expanded into a hierarchical network with many stations. A time-slotted version provides for even higher efficiencies, and priorities can be assigned to individual message packets. Other aspects and advantages of the invention will become apparent from the following more detailed description, taken in conjunction with the accompanying drawings.

DESCRIPTION OF THE PREFERRED EMBODIMENTS

As shown in the drawings for purposes of illustration, the present invention is concerned with optical fiber communication networks employing star couplers for the broadcast of messages to a plurality of stations. A star coupler is an optical device having at least one input port and a plurality of output ports. A light signal applied to the input port is distributed, in approximately equal proportions, to the output ports. In a communications system employing such a device, each of a plurality of stations has an incoming transmission channel for sending messages to a central location, and an outgoing transmission channel connected to a corresponding output port of the star coupler. Any station may transmit a message to other stations by sending a message packet along the sending station's incoming channel. At the central location, the message is applied to the star coupler and thereby broadcast to all of the stations, along the outgoing channels.

Although systems of this type have been proposed in the past, they have suffered from various disadvantages, such as an unbounded, i.e. potentially infinite, network delay. In other words, if a station wishing to transmit a new message finds that it cannot, because the star coupler is already busy transmitting another message, then the station has to try again at some later time. If the coupler is still busy, the new message will be further delayed, and so forth.

In accordance with an important aspect of the invention, incoming messages are automatically queued at the central location, for transmission when the coupler becomes free. One embodiment of the invention queues the messages in order of their time of origination, and another embodiment queues the messages in accordance with a predefined set of message or station priorities. As will be discussed in detail, the invention may also be implemented as a time-slotted version, or as an unslotted version. The invention also has a hierarchical or non-hierarchical version. The network of the invention is also easily adaptable to handle continuous-traffic stations that need to transmit message packets in continuous stream.

Figure 1:
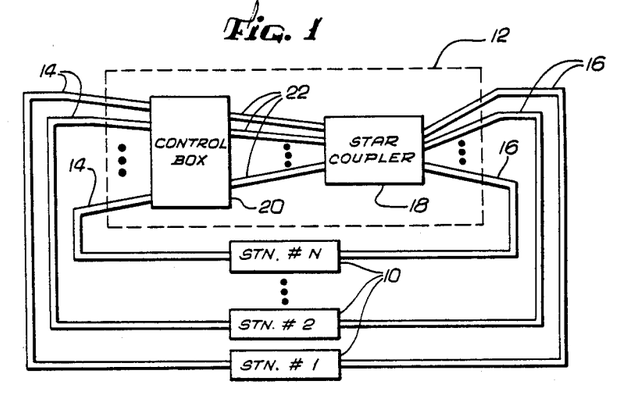
FIG. 1 is a simplified block diagram of a controlled star coupler.

By way of introduction, FIG. 1 shows in simplified form the principle of operation of a star coupler communications network. Basically, the network includes a plurality of stations, indicated by reference numeral 10, and a single controlled star coupler 12. A plurality of incoming channels 14 and outgoing channels 16 connect the stations 10 with the controlled star coupler 12, each station having one incoming channel for the transmission of messages to the coupler, and one outgoing channel for receiving messages from the coupler.

The controlled star coupler 12 includes an optical star coupler 18 and a control device referred to as a control box 20. The incoming channels 14 are all connected to the control box 20, whose function is to select only one channel for the star coupler 18. FIG. 1 shows a plurality of lines 22 between the control box 20 and the star coupler 18. In fact, as will be seen, there may be only one electrical line between the control box and star coupler, or there may be a plurality of optical fibers, only one of which is selected to carry a signal to the coupler 18. The outgoing channels 16 are connected to receive output signals from the star coupler 18.

Figure 2:
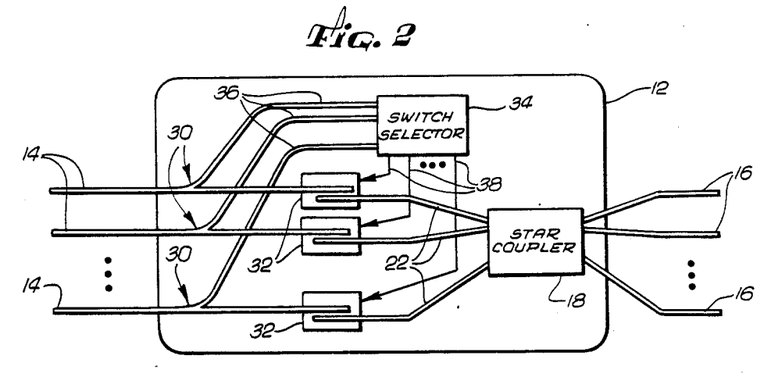
FIG. 2 is a block diagram of an implementation of the controlled star coupler for a single-mode fiber network.
Figure 3:
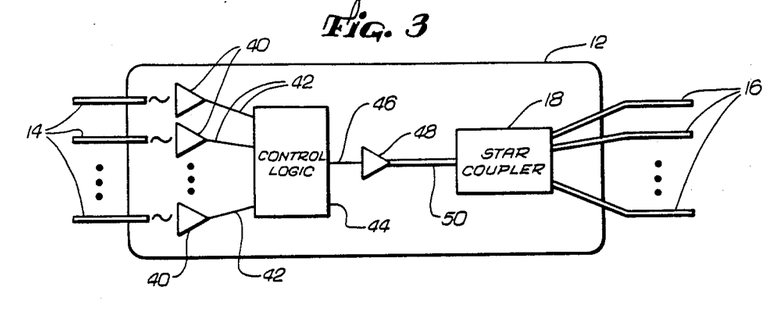
FIG. 3 is a block diagram of an implementation of the star coupler for a multi-mode fiber network.

FIGS. 2 and 3 illustrate two more specific configurations, for single-mode fiber and multi-mode fiber systems, respectively. In the single-mode case, the control box 20 includes a plurality of signal taps 30, an equal number of optical switches 32, and a switch selector 34. The switch selector 34 monitors the signals on the incoming channels 14 by means of channels 36 extending from the signal taps 30 to the selector, and generates control signals on lines 38 to the switches 32. In accordance with selection rules designed into the switch selector 34, no more than one control signal is generated on the lines 38, to close only one of the switches 32 at any particular time.

In the multi-mode system shown in FIG. 3, the incoming channels 14 are connected to corresponding light detectors 40, each of which has an electrical output line 42 extending to control logic 44. The control logic 44 generates an output signal on line 46 to transmit a selected message. The output line 46 is connected to an electro-optical transducer or light emitter 48, the light from which is launched into an optical fiber 50, which is the only input channel into the star coupler 18.

The basic version of the controlled star coupler of the invention is an unslotted, non-preference version, meaning that messages are transmitted in the order in which they were originated, and in accordance with no particular allocation of time slots. One advantage of the invention is that each of the stations 10 follows a relatively simple set of protocol rules. When a staion has a message packet to transmit, it merely begins transmitting on its incoming line 14, and continues to transmit the packet repetitively until the same packet is sensed on the outgoing line 16 from the star coupler 18.

The control logic 44 of the basic version of the controlled star coupler 12 maintains an active queue of stations having packets to transmit. When a transmitting station is sensed for the first time, the corresponding station number is placed in the active queue. When the coupler 18 becomes available, the next station awaiting access to the network is selected from the queue, and transmission from the selected station is routed through the control logic 44 to the star coupler 18. In the non-preference version of the invention, stations are queued in the same sequence in which they were originally detected as transmitting a message packet.

In accordance with another important feature of the invention, every station that is granted access to the network and successfully transmits a message packet, is then temporarily blocked from further access for a preselected time interval. The blocking time interval is preferably greater than the round-trip propagation time for a message packet. The purpose of this feature is twofold: first, to prevent duplication of a packet transmission, and second, to protect the network from being "captured" by a single station. Packet duplication could otherwise occur because the transmitting station cannot sense its own broadcast message packet for a period equal to the round trip propagation time. In the interim, the station would continue transmitting the packet repetitively. The control logic 44 at the controlled star coupler would, if no blocking interval were imposed, sense these continued transmissions as new requests for network access, and would enter the same station in the active queue again. When the blocking interval is in effect for a particular station, that station cannot be selected for network access, so there can be no duplication of packets if the blocking interval is long enough.

Figure 4:
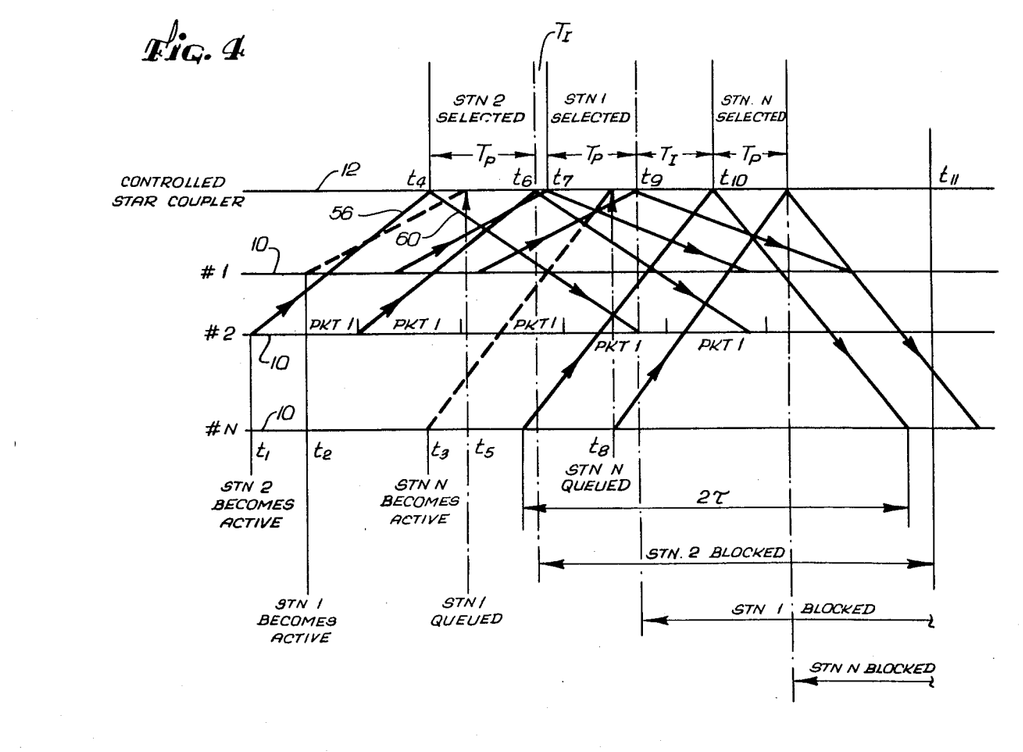
FIG. 4 is an activity diagram showing typical activity in an unslotted non-hierarchical non-preference controlled star network.

These concepts may perhaps be more clearly understood from a review of the activity diagram of FIG. 4. The sloping lines in the figure represent the propagation of a message from the nodes or stations, indicated by the horizontal lines 10, to the controlled star coupler, indicated by the horizontal line 12, and back again. The horizontal axis in the diagram represents time.

In the example shown in FIG. 4, the first station to become active is station #2. A first message packet is transmitted beginning at time $t_1$. At time $t_2$, station #1 begins transmitting a packet, and at time $t_3$, station #n begins transmitting a packet. The packet from station #2 is received at the coupler beginning at time $t_4$. The propagation of the "leading edge" of this packet is indicated by the sloping line 56. Before time $t_4$, station #2 completes transmission of the packet and begins transmitting it again, as indicated by the sloping line 58. Since the coupler is not busy at time $t_4$, station #2 is, at that time, selected for transmission, and broadcast of the first packet from station #2 immediately begins, as indicated by sloping line 60. The time of transmission of the packet from station #2 is equivalent to the packet length, and ends one packet interval after the beginning of the transmission, i.e. an interval $T_p$ after time $t_4$. At this point, station #2 is blocked from further transmission for a period of at least the round-trip transmission time for the station.

At time $t_5$, the first packet from station #1 begins to arrive at the coupler location. However, station #2 is currently selected for transmission, so station #1 is queued for subsequent transmission. At time $t_6$, the station #2 packet has been broadcast. At this time, station #1 can be selected from the queue, since the coupler is no longer busy. Between $t_6$ and $t_7$, a time period of $T_I$, a fragment of packet from station #1 is broadcast, which is unrecognizable by any station and therefore wasted.

At time $t_8$, the first packet from station #n begins to arrive at the coupler, but station #1 is currently selected, so station #n is queued for later transmission. At time $t_9$, the station #1 transmission has ended; and station #n can be selected from the queue. A complete station #n packet is broadcast over the outgoing channels beginning at time $t_{10}$. As at the end of the station #2 transmission, stations #1 and #n are also temporarily blocked from further transmission for an interval after the successful broadcast from the respective stations.

The controlled star coupler starts to pay attention again to station #2 at time $t_{11}$, the end of the blocking period for station #2. Similar blocking periods are applied to the other stations.

From FIG. 4, it can be seen that the efficiency of the network, which is the ratio of the time that a packet takes to be transmitted to the total time elapsed to effect the packet transmission, is given by the expression:

$$E = T_p/(T_p + T_I),$$

where $T_I$ is the interval between packets, as viewed on one of the outgoing channels.

The interval $T_I$ can vary from a minimum of zero to a maximum of $T_p$, in a system in which there are at least two stations competing for network access. Therefore, the average value of $T_I$ is $T_p/2$, and the efficiency can be expressed:

$$E = T_p/(T_p + T_p/2) = 66.7\%.$$

This efficiency is independent of the propagation delay and the transmission rate.

The network delay, i.e. the time that a station must wait in order to have its message packet broadcast by the coupler, is bounded by:

$$D = 2T_p(N-1) + 2\tau,$$

where
N is the number of stations,
$T_p$ is the packet transmission time, and
$2\tau$ is the round-trip propagation time.

Figure 5:
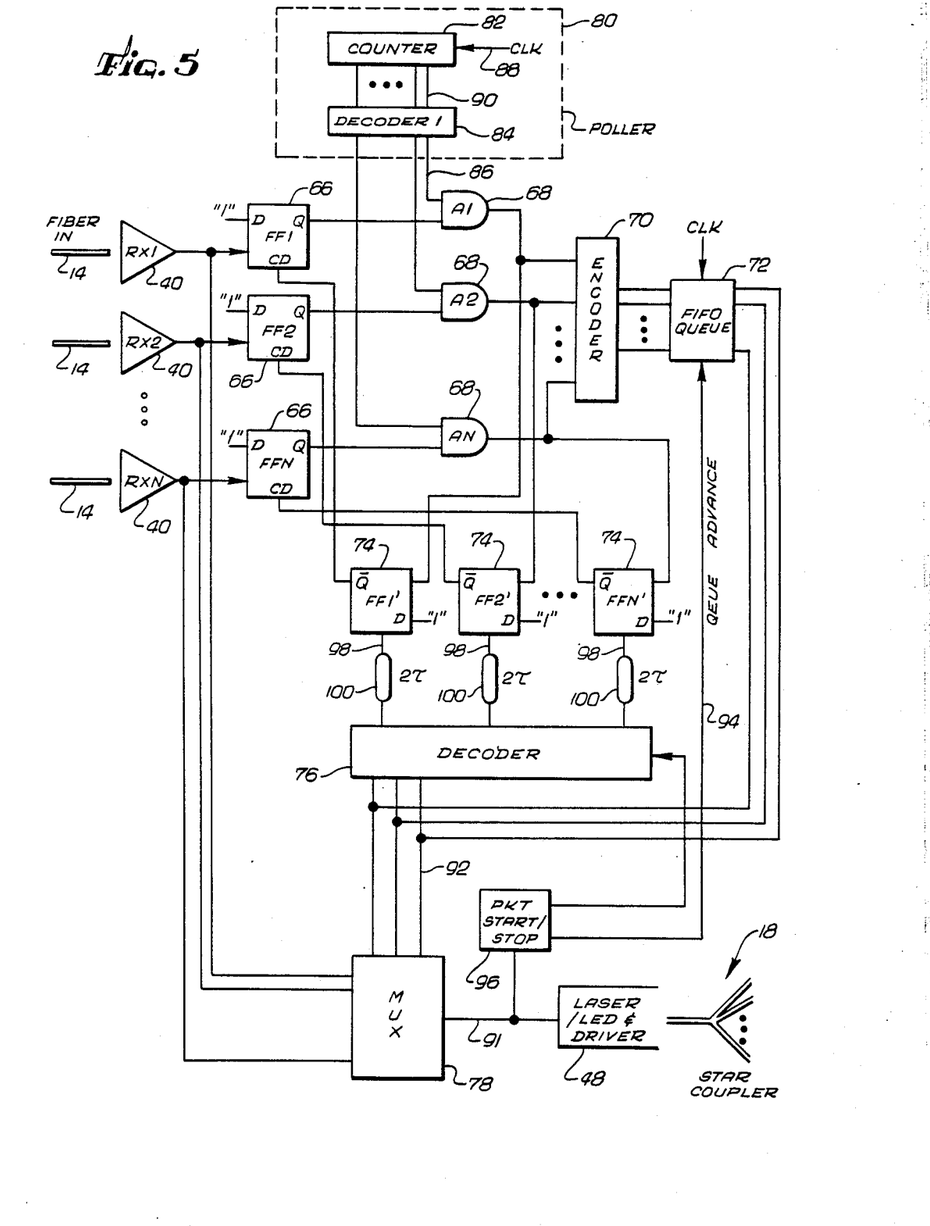
FIG. 5 is a logic diagram of an illustrative implementation of an unslotted, non-hierarchical, non-preference version of the controlled star coupler.

FIG. 5 shows an illustrative implementation of the controlled star coupler of the invention. In addition to the detectors 40 and the light emitter 48, the control logic includes a plurality of D flip-flops 66 coupled to receive the outputs of the detectors, a plurality of AND gates 68, an encoder circuit 70, a first-in-first-out queueing circuit 72, another equal plurality of D flip-flops 74, a decoder circuit 76, and a multiplexer 78. In addition, there is a polling circuit 80, which includes a counter 82 and another decoder circuit 84.

When a signal is received at one of the detectors 40, the corresponding flip-flop 66 will be set. The polling circuit 80 functions to generate a cyclic sequence of signals on its N output lines 86, each of which is connected to one input of a corresponding AND gate 68. The counter 82 in the polling circuit 80 is incremented sequentially by a clocking signal, indicated at 88, and produces a succession of binary counts on its output lines 90. The counts are decoded in the decoder 84, and this results in a one-in-N signal on the output lines 86. These signals enable each of the AND gates 68 in turn, in a cyclic sequence that polls the flip-flops 66. If any of the AND gates 68 generates a logical-one output, this is fed to the encoder 70, which converts the one-in-N input to a corresponding binary count indicative of the station number transmitting a message packet. This station number is input to the queuing circuit 72.

The outputs of the AND gates 68 are also connected to the data inputs of the other set of flip-flops 74. The inverse outputs of these flip-flops are connected to clear the first set of flip-flops 66, thereby preventing multiple registration and queuing of an incoming message packet.

The multiplexer 78 receives as inputs the signals from the detectors 40, and selects one of the inputs for output on line 91, based on the count applied to the multiplexer address lines 92. These address lines obtain a count or station number from the queuing circuit 72, in response to a queue advance signal on line 94 from a packet start/stop detector 96. Basically, the packet start/stop detector 96 detects the end of a message packet and then generates the queue advance signal on line 94, to select of a station number from the head of the queue.

After a station's transmission has been detected and queued, the corresponding flip-flop 74 prevents redetection of further transmissions, by holding the corresponding flip-flop 66 in a clear state. Even after a station has been selected for transmission of its message packet, the appropriate flip-flop 74 still operates to prevent further detection of messages from the selected station. Upon the detection of the end of the current broadcast packet, decoder 76 generates a clearing signal on one of a plurality of lines 98 connected to the clearing terminals of the flip-flops 74. However, connected in each of the lines 98 is a time delay circuit 100, which imposes a delay of at least the round-trip propagation time. This delay keeps a selected station effectively blocked from further transmission for the desired interval of time.

A special case of the non-preference version of the invention arises when the round-trip propagation delay $2\tau$ is less than the packet transmission time $T_p$. In this case, a station can sense a successful transmission before it finishes transmitting a packet, and can therefore abort the packet transmission and begin from the start of the packet again. In other words, a station seeking access to the network retransmits every $2\tau$ seconds before it is selected, and continues transmission until the end of the packet once it has been selected. The efficiency in this case is given by:

$$E = T_p/(T_p + 2\tau/2)$$
$$= 1/(1 + \tau/T_p).$$

For example, if the network diameter is 100 meters, then $\tau = 500$ nanoseconds (ns). If the packet length is 1,000 bits and the transmission rate is 500 megabit per second, then $T_p$ is 2000 ns and $$E = 1/(1 + 500/2000)$$

= 80%.

Figure 6:
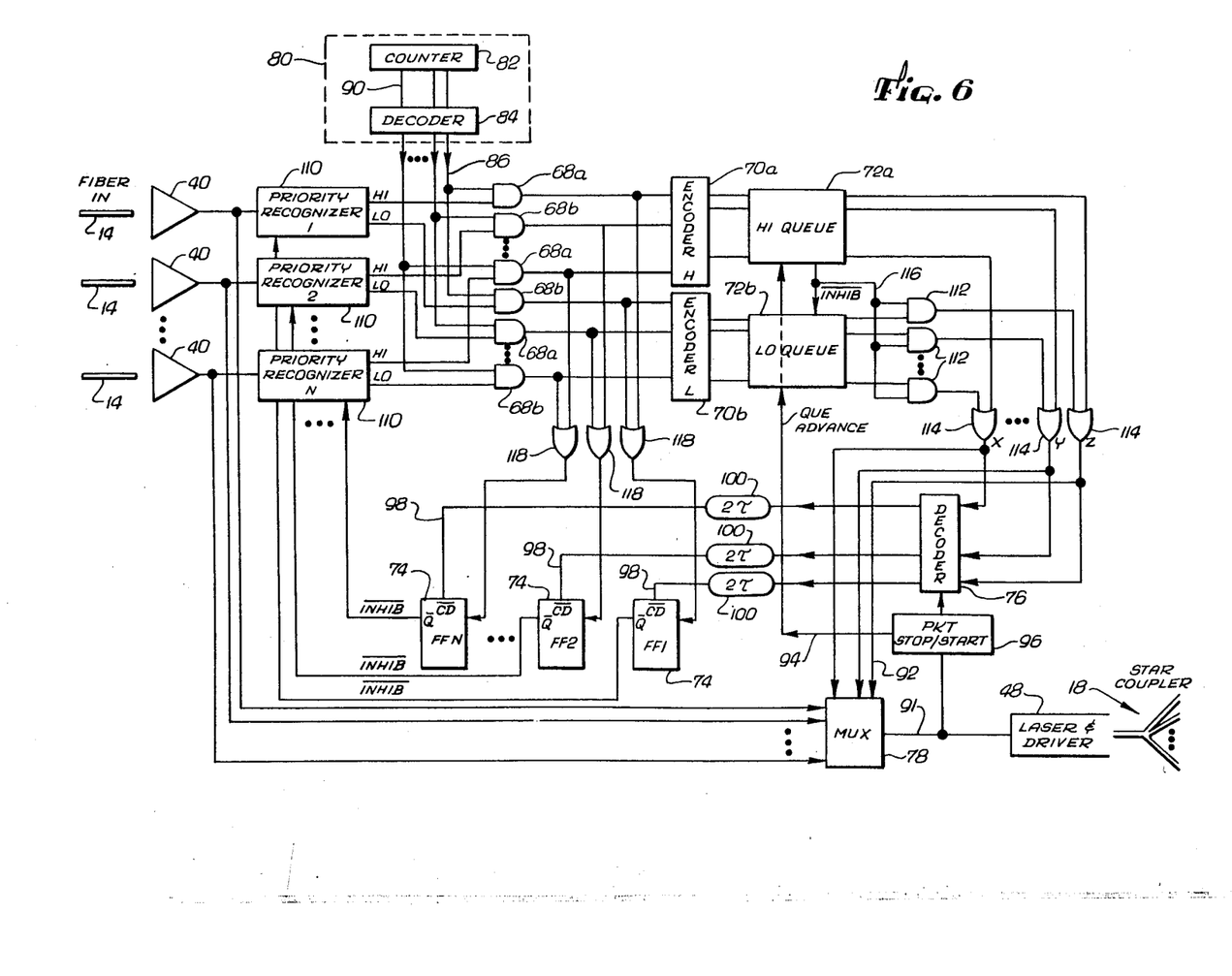
FIG. 6 is a logic diagram of an unslotted, non-hierarchical, prioritized version of the controlled star coupler.

FIG. 6 shows how the selection logic can be modified to provide a prioritized system, in which the message packets have one of two priorities. It will be seen that the logic is similar to that of FIG. 5, but with a few additional components. Specifically, FIG. 6 includes a plurality of priority recognition circuits 110 instead of the flip-flops 66. The detailed structure of these circuits will depend on the nature of the priority coding of the message packets, but in essence each such circuit will include at least two flip-flops, to store a high-priority and a low-priority flag derived from a received message packet. The AND gates 68 are replaced in this logic by N pairs of AND gates 68a and 68b, corresponding to the high and low priorities. Similarly, there are two encoders 70a and 70b, and two queuing circuits 72a and 72b.

The queuing logic operates in a similar fashion to the non-preference version. When a message packet is detected by one of the detectors 40, a high- or low-priority signal is generated on the outputs from the priority recognition circuit 110. Polling proceeds in the same manner as in the basic version, but each output line 86 from the polling circuit 80 in this version enables two AND gates 68a and 68b. Accordingly, a station number is placed in one of the queues 72a and 72b, depending on the packet priority.

Selecting a station from the queue requires some additional logic, including a plurality of AND gates 112 and a like plurality of OR gates 114. The AND gates 112 receive as one set of inputs the outputs of the low-priority queue 72b, and have as enabling inputs a signal on line 116 from the high-priority queue 72a. So long as the high-priority queue 72a is empty, the enabling signal on line 116 functions to enable the AND gates 112 and to thereby transmit the output signal from the low-priority queue 72b to the OR gates 114. If the high-priority queue 72a has at least one entry, the signal on line 116 operates to inhibit the low-priority queue 72b by disabling the AND gates 112. The outputs of the two queues 72a and 72b are ORed together in the OR gates 114, and the outputs are applied to the multiplexer 78 to select a station for transmission. As in the basic version of the invention, the selected item from the queues also has its station number decoded in the decoder 76, for purposes of generating an appropriately delayed signal to clear the corresponding flip-flop 74.

A further addition to the logic in FIG. 6 is another set of OR gates 118, used to logically OR pairs of signals from the AND gates 68a and 68b, to generate signals to set the flip-flops 74. In FIG. 6, the flip-flops 74 are again used to transmit inhibit signals back to the priority recognizer circuits 110, to prevent more than one registration into the queues. Another change is that the queue advance signal on line 94 has to be applied to both queues 72a and 72b.

A significant advantage of the controlled star coupler of the invention is that it may be readily connected in a hierarchical version that can accommodate a large number of stations without undue complexity. In the hierarchical version, shown in FIG. 7, there are multiple controlled star couplers, three of which are indicated at 12.1, 12.2 and 12.m. Each of the controlled star couplers includes a control box, indicated at 20.1, 20.2 and 20.m, and a star coupler 18.1, 18.2 and 18.m. Each controlled star coupler 12 is coupled to a plurality of stations 10. For example, the control box 20.1 is connected by incoming channels 14 to a plurality of the stations 10, and the star coupler 18.1 is connected by a plurality of outgoing channels 16 to the same stations.

Figure 7:
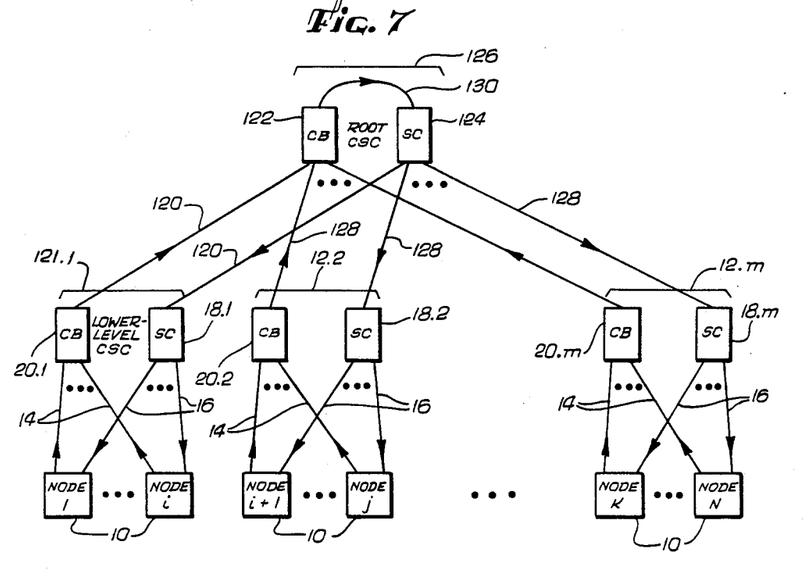
FIG. 7 is a block diagram of an exemplary hierarchical controlled star network.

In the single or non-hierarchical version, the control box 20 is connected directly to the star coupler, as shown in FIG. 1. In the hierarchical version, however, the each control box has an output channel 120 connected as an incoming channel to a higher level control box 122. The higher level control box 122 has an associated star coupler 124, and the two components together form a higher level controlled star coupler, referred to as the root controlled star coupler 126. The control box 122 of the root controlled star coupler 126 can receive incoming messages over the lines 120, and generates broadcast messages on outgoing lines 128 to the lower level star couplers 18.1–18.m. In the root controlled star coupler 126, the control box 122 and star coupler 124 are connected by a single channel 130.

In effect, the controlled star couplers 12.1–12.m are treated as stations of the root controlled star coupler 126. From FIG. 7 it will be apparent that the message path from one station 10 to another first extends along an incoming line 14 to a lower level controlled star coupler 12. Once the sending station has been selected, the message is passed up to the higher level or root controlled star coupler 126. There is a further selection process in the root controlled star coupler 126, and then the message is broadcast through the lower-level star couplers 18 to all of the stations 10.

The only difference between the lower-level controlled star couplers 12 and the root controlled star coupler 126 is that the lower-level form lets a selected station transmit repetitively until the stations itself stops transmitting. The root level form of the coupler transmits a selected message only once, as in the basic version described earlier. Otherwise, the controlled star couplers at all levels are identical and may be conveniently fabricated in a uniform manner. The differences between them than be incorporated by means of appropriate switches or jumper wires. It will be understood that the hierarchy is not limited to two levels, and may be expanded in a similar fashion if it is necessary to accommodate additional stations.

Figure 8:
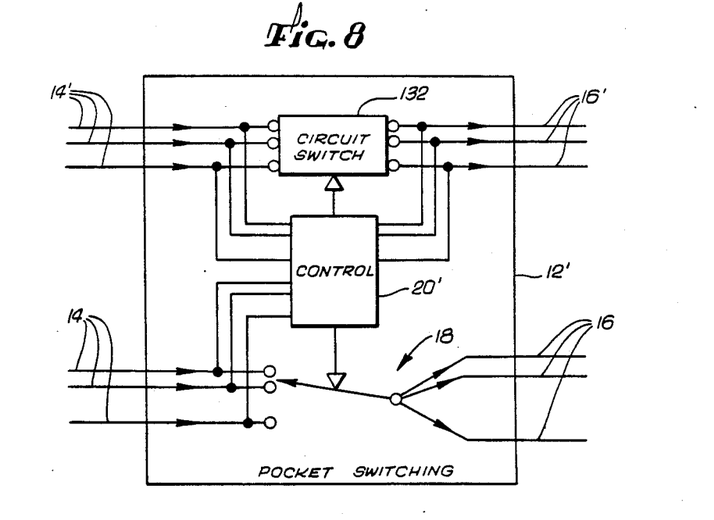
FIG. 8 is a block diagram of a controlled star coupler having circuit switching means for handling continuous-traffic stations.

FIG. 8 illustrates diagrammatically how the controlled star coupler of the invention can be used with a circuit switching device, indicated at 132. Although, as will be explained below, continuous-traffic stations can be handled in the slotted version of the controlled star coupler, it may be desirable in some applications to separate the continuous traffic from the other regular traffic, as shown in FIG. 8. Incoming channels 14 are fed to a modified control box 20', which selects one of the channels for output to the star coupler 18, as shown, for handling the regular traffic.

For those stations with a need to transmit continuous traffic, separate incoming lines 14' and outgoing lines 16' are utilized. A station with a continuous-traffic need sends an appropriate control message to the control box 20', which responds by setting up the circuit switch 132 to direct the expected continuous message traffic to one or more destination stations. The switch 132 is a matrix switch capable of interconnecting stations in any desired combination. After transmission of the continuous traffic, the originating station may send another control message, to reset the circuit switch 132 to its original state. In this manner, the functions of packet switching and circuit switching can be conveniently combined in one network.

The efficiency of the network can be further improved to approximately 100% if the available network time is divided into fixed intervals of length $T_p$. This is the basis of the slotted version of the network, and a typical activity diagram is presented in FIG. 9. In this version, a station 10 can start transmission only at the beginning of a slot. As in the unslotted version, the station continues to repeat its transmission until the sensing of the same packet broadcast from the controlled star coupler 12.

The rules for the controlled star coupler are basically as follows, for the non-hierarchical slotted version. At the beginning of each time slot, the controlled star coupler tests to determine which stations are newly transmitting ones. The station numbers of the newly transmitting stations are entered into one or more queues, in the same manner as in the unslotted versions of the network. After a station is selected and has transmitted, it is blocked for a time corresponding to $(K-1)$ slots, were $KT_p < =2\tau$. Since the time spacing between packets broadcast through the star coupler can be theoretically zero, the efficiency can as high as 100%.

The control box logic necessary to operate the slotted version of the invention is almost identical to that shown in FIGS. 5 and 6. The basic difference is that the incoming lines are not continuously polled, but are polled only at the beginning of each time slot.

Figure 9:
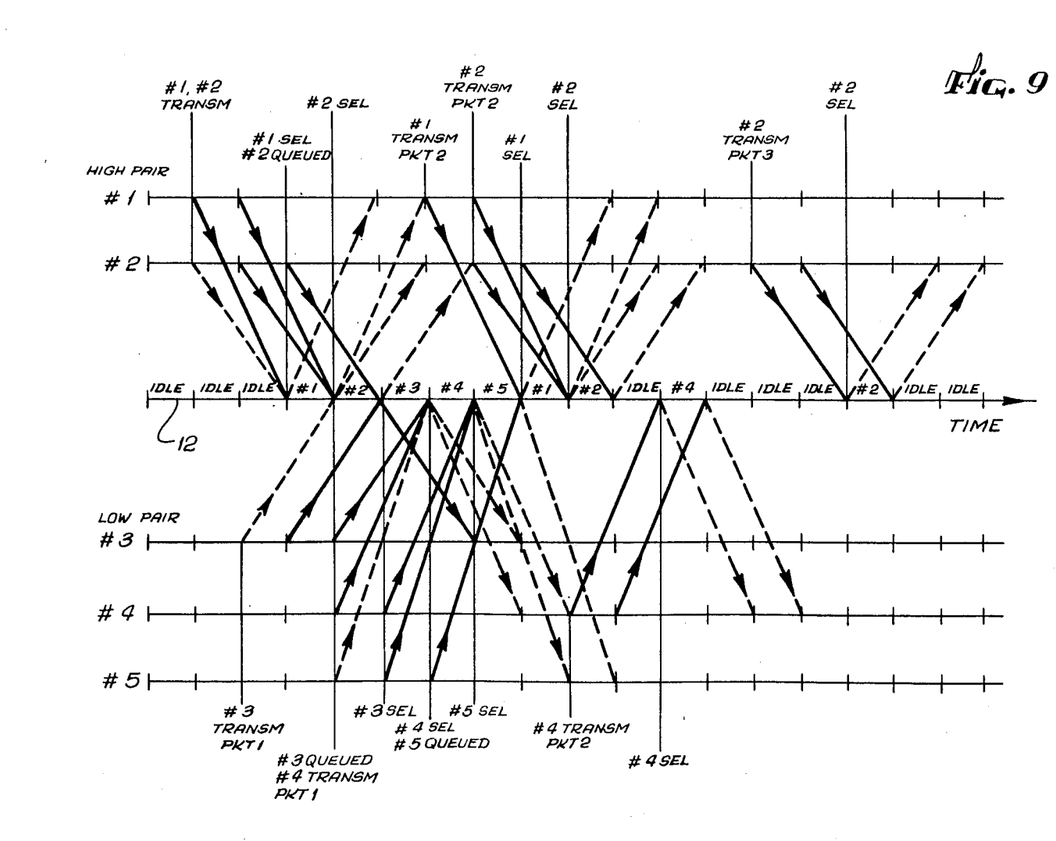
FIG. 9 is an activity diagram showing typical activity in a slotted version of the controlled star network.

In the activity diagram of FIG. 9, it is assumed for simplicity that each packet is received at the controlled star coupler at the beginning of a time slot. The diagram shows the activity of two high-priority stations (stations #1 and #2) and three low-priority stations (#3, #4 and #5). It will be recalled that priority may be assigned by message packet, but in the illustrative activity diagram, it is assumed that stations #1 and #2 will always transmit high-priority message packets and the other stations will transmit low-priority message packets. It will be seen that, for a period of seven consecutive time slots, the coupler is broadcasting continuously, without any spaces between message packets, which is equivalent to an efficiency of 100%.

The slotted version may also be implemented in hierarchical form, if the number of stations is too great for a single controlled star coupler. The elements of the hierarchical structure operate in much the same manner as in the unslotted hierarchical version.

The slotted version of the invention is also well suited to handle continuous-traffic stations. If a continuous-traffic staion has a requirement to send a packet of data ever $t_g$ seconds, its accessing protocol is modified to transmit each packet M times, where $MT_p = t_g$. Then it transmits the next packet an equal number of times, and so forth. At the controlled star coupler, there is included means for distinguishing continuous-traffic stations from the others. This could take the same form as priority encoding in the message packets. In any event, the continuous-traffic stations are treated differently in terms of queuing and in terms of blocking after selection. Continuous-traffic stations with messages are queued in a high-priority queue, and are therefore selected in preference to other regular traffic. In addition, when a continuous-traffic station is selected, the station is subsequently blocked for a period corresponding to the next M−1 time slots. This ensures that the next possible packet that can be accepted for transmission from the selected station will not be the same packet that was previously accepted.

Stations sending regular traffic are delayed by an amount greater or equal to the round-trip propagation time, as in the basic unslotted network. The slotted system used in this manner to process continuous-traffic stations is not as easily implemented in hierarchical form, and is, therefore, most conveniently limited to the non-hierarchical version.

It will be appreciated from the foregoing that the present invention represents a significant advance in the field of optical fiber communications networks. In particular, the invention provides a highly efficient network in which messages are automatically queued for transmission, resulting in a relatively low and bounded network delay. In addition, the network of the invention is easily expandable into a hierarchical version capable of handling larger numbers of stations, using practically identical controlled star coupler modules. Both timeslotted and unslotted versions are available, and message queuing can be either by time of origination or in accordance with priorities assigned to the message packets. The network is also capable of handling continuous-traffic stations, and is unaffected by a station malfunction in which the station transmits continuously.

It will also be appreciated that, although specific embodiments of the invention have been illustrated in detail by way of example, various modifications may be made without departing from the spirit and scope of the invention. Accordingly, the invention is not to be limited except as by the appended claims.

I claim:

1. A controlled star coupler communications network, comprising:
    a plurality of transmitting and receiving stations;
    an equal plurality of incoming transmission channels from the stations;
    selection means for choosing one of the incoming channels for broadcast;
    an equal plurality of outgoing transmission channels for transmission of messages to the respective stations; and
    a star coupler for distributing the message received on the selected incoming channel to all of the outgoing channels;
    and wherein the selection means includes means for determining whether the star coupler is busy broadcasting a message, and queueing means, for queueing any incoming messages by channel identity for later selection when the star coupler is already broadcasting a prior message.

2. A communication network as set forth in claim 1, wherein:
    the queueing means has a single active queue operating on a first-in-first-out basis.

3. A communications network as set forth in claim 1, wherein:
    the queueing means includes at least two levels of priority, wherein high-priority messages are selected before low-priority messages.

4. A communications network as set forth in claim 1, wherein:
    each of the stations begins transmitting when it has a message packet ready to send, and continues transmitting unitl sensing of the same packet received on its outgoing channel from the star coupler.

5. A controlled star coupler communications network, comprising:
- a plurality of transmitting and receiving stations;
- an equal plurality of incoming transmission channels from the stations;
- selection means for choosing one of the incoming channels for broadcast;
- an equal plurality of outgoing transmission channels for transmission of messages to the respective stations; and
- a star coupler for distributing the message received on the selected incoming channel to all of the outgoing channels;
- wherein the selection means includes queueing means, for queueing any incoming channel for later selection when the star coupler is already broadcasting a prior message;
- and wherein
  - available time on the network is divided into time slots of a duration equal to the time it takes to transmit or receive one message packet,
  - each of the stations begins transmitting only when it has a packet ready to send and only at the beginning of a time slot, and
  - the queueing means polls for and queues newly transmitting stations only once every time slot.

6. A communications network as set forth in claim 1, wherein:
the selection means further includes means for blocking a selected station from being selected again for a preselected time interval.

7. A communication network as set forth in claim 6, wherein:
the selected time interval is at least as great as the round-trip time for propagation of a message packet from the station to the selection means and back to the station again.

8. A controlled star coupler communications network, comprising:
- a plurality of transmitting and receiving stations;
- an equal plurality of incoming transmission channels from the stations;
- selection means for choosing one of the incoming channels for broadcast;
- an equal plurality of outgoing transmission channels for transmission of messages to the respective stations; and
- a star coupler for distributing the message received on the selected incoming channel to all of the outgoing channels;
- wherein the selection means includes queueing means, for queueing any incoming channel for later selection when the star coupler is already broadcasting a prior message;
- wherein the queueing means includes
  - register means, for registering the arrival of a message packet from each station, and for registering the priority of the message,
  - polling means, for scanning the register means for newly detected active stations,
  - encoding means, for converting the location of a registered message in the register means to a corresponding station number, and
  - at least two queues for storing station numbers from the encoding means.

9. A communications network as set forth in claim 8, wherein the selection means further includes:
multiplexing means addressable by station number and connected to receive incoming channels from the stations and to provide a single output channel to the star coupler; and
means for retrieving a station number from the queues, including means for sensing the end of a message packet supplied to the star coupler, and in response issuing a queue advance signal to retrieve an item from the queues.

10. A communications network as set forth in claim 9, wherein the selection means further includes:
means for selectively inhibiting operation of the register means for a preselected time interval, to prevent duplicate transmissions and continued access by a single station.

11. A hierarchical controlled star communications network, comprising:
- a first level having a plurality of controlled star couplers, each with selection means connected to receive messages from a plurality of sending and receiving stations, and with a star coupler connected to transmit to the same plurality of stations, wherein each selection means has an output port for transmission of a message from the selected station and each star coupler has an input port for input of a message to a broadcast to the plurality of stations;
- at least one additional level having at least one additional controlled star coupler, which has an additional selection means and an additional star coupler, wherein the additional selection means receives over incoming channels messages transmitted from the output ports of the first-level selection means, and the additional star coupler transmits over outgoing channels to the input ports of the first-level star couplers; and
- means connecting the output port of the additional selection means with the input port of the additional star coupler;
- whereby a message transmitted by one of the stations is first selected by one of the first-level selection means, transmitted to the additional selection means, and, upon selection there, is transmitted back through the additional star coupler and the first-level star couplers, to be broadcast to all of the stations.

12. A hierarchical communications network as set forth in claim 11, wherein:
the first-level selection means are operative to keep transmitting a selected message until the originating station ceases transmission.

13. A hierarchical communications network as set forth in claim 12, wherein:
the number of levels is two.

14. A hierarchical communication network as set forth in claim 11, wherein:
each selection means in the first and additional levels includes queuing means, for queuing incoming message sources for later selection if the corresponding star coupler is currently busy.

15. A controlled star coupler communications network, comprising:
- a plurality of transmitting and receiving stations;
- an equal plurality of incoming transmission channels from the stations;
- selection means for choosing one of the incoming channels for broadcast;

an equal plurality of outgoing transmission channels for transmission of messages to the respective stations;

a star coupler for distributing the message received on the selected incoming channel to all of the outgoing channels; and means for processing the receipt of continuous traffic from at least one continuous-traffic station, and according a higher priority to meassages from the continuous-traffic stations;

and wherein the selection means includes queueing means, for queuing any incoming channel for later selection when the star coupler is already broadcasting a prior message.

* * * * *